United States Patent [19]

Hice

[11] 4,273,033
[45] Jun. 16, 1981

[54] METHOD AND APPARATUS FOR FLASH COOKING FOOD

[75] Inventor: Jaxon O. Hice, Clover, S.C.

[73] Assignee: Research Associates, Ltd., Charlotte, N.C.

[21] Appl. No.: 945,229

[22] Filed: Sep. 25, 1978

Related U.S. Application Data

[62] Division of Ser. No. 804,492, Jun. 8, 1977, Pat. No. 4,123,560.

[51] Int. Cl.³ .............................................. A47J 37/12
[52] U.S. Cl. ........................................ 99/349; 99/403
[58] Field of Search ................ 99/349, 339, 403, 404, 99/406, 415, 422, 423, 430, 439, 443 C; 100/DIG. 100; 126/390; 426/438, 509

[56] References Cited

U.S. PATENT DOCUMENTS

| | | | |
|---|---|---|---|
| 1,216,973 | 2/1917 | Epprecht | 126/390 X |
| 1,271,796 | 7/1918 | Stivers et al. | 99/349 X |
| 1,707,532 | 4/1929 | Moon | 99/339 |
| 2,191,275 | 2/1940 | Fink | 426/438 |
| 2,423,963 | 7/1947 | Coffman | 99/422 X |
| 2,840,436 | 6/1958 | Mason | 99/422 X |
| 3,124,122 | 3/1964 | Baron | 99/406 X |
| 3,570,393 | 3/1971 | Schy | 99/404 |
| 3,576,647 | 4/1971 | Liepa | 99/404 UX |
| 3,687,067 | 8/1972 | Bettcher | 100/DIG. 100 X |
| 3,716,140 | 2/1973 | Keating | 99/406 X |

FOREIGN PATENT DOCUMENTS 618324 of 1949 United Kingdom ................ 126/390 X Primary Examiner—Harvey C. Hornsby
Assistant Examiner—Arthur O. Henderson
Attorney, Agent, or Firm—Richards, Shefte & Pinckney

[57] ABSTRACT

A method and apparatus for rapidly cooking food which includes pressing food directly against a very hot cooking surface with a liquid interface therebetween while the food is submerged in a heated cooking liquid, such as a water-base broth. The cooking surface is preferably formed with a plurality of dispersed dimples which collect and contain the liquid interface at the cooking surface when the food is pressed thereagainst. The apparatus includes two pans located at the entending ends of a connecting conduit with a perforated compression plate for pressing food against the bottom surface of each pan, and a burner is disposed beneath each pan. Controls are provided for alternately lowering the pans to positions immediately above these respective burners and to permit the cooking liquid to flow into the lowered pan, and for automatically energizing and de-energizing the burners when the pans are lowered and raised with respect thereto.

5 Claims, 7 Drawing Figures

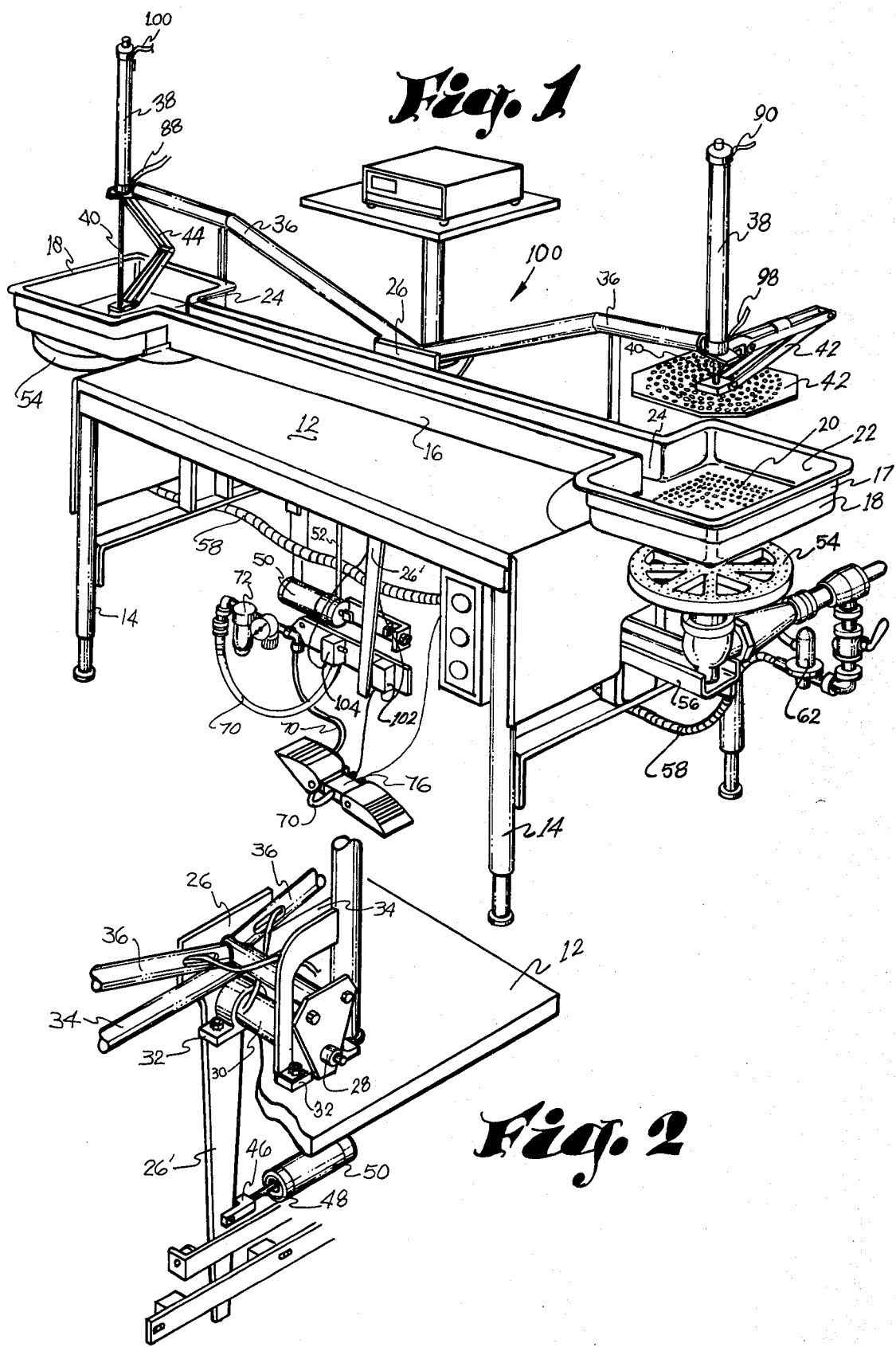

METHOD AND APPARATUS FOR FLASH COOKING FOOD

CROSS-REFERENCE TO RELATED APPLICATIONS

This application is a division of parent application Ser. No. 804,492, now U.S. Pat. No. 4,123,560 filed June 8, 1977.

BACKGROUND OF THE INVENTION

There are a variety of conventional methods of cooking raw food, including baking, broiling, boiling, frying, and, more recently, using microwave or high frequency radio waves which generate heat. Regardless of what method of cooking is used, it is generally desirably for several reasons, to cook food in the fastest possible manner. In institutional or commercial food operations, it is obvious that greater efficiency and less costs result from faster cooking, and in home cooking, less food preparation time offers obvious advantages. These considerations have resulted in the advent of cooking apparatus and methods which are particularly designed to speed up the cooking process, such as microwave ovens, and pressure cookers in which the temperature of cooking medium (e.g. water) can be raised above its normal boiling point to thereby decrease the time required to cook food in the cooking medium.

Fast cooking, however, presents problems which can result in waste because of food shrinkage and which adversely affect the palatal characteristics of the food. For example, in pan frying food, it will be apparent that cooking time can be proportionately decreased by increasing the temperature of the heat source applied to the pan, but, at very elevated pan surface temperatures, the surface of the food which is in contact with the pan surface may be burned. Moreover, food which is cooked rapidly tends to loose some of its natural flavor which is "boiled off" during the cooking process, and, in some instances, the food will tend to curl up or otherwise become distorted.

In an effort to avoid curling of the food, it is a common practice to provide a flat cover that is placed on the food to hold it against curling while it is being cooked, a typical example of a cover of this type being disclosed in U.S. Pat. No. 3,252,404, issued May 24, 1966. It will be apparent, however, that these covers will not reduce the possibility of the food being burned if the pan surface temperature exceeds a predetermined level, and the food must be turned periodically to provide even cooking of the food.

To reduce food shrinkage and curling, at elevated cooking temperatures, and to avoid surface contact burning of the food, it has been proposed in U.S. Pat. No. 2,191,275 issued Feb. 20, 1940, that the food be compressed between a pair of pressure plates and then suspended in a pot of hot oil which is heated by an external heater unit. Cooking in this manner reduces the cooking time and avoids the danger of surface contact burning because the food is suspended, and the required heat for fast cooking is obtained from oil which can be raised to a very high temperature (e.g. 350° F.) without boiling. However, this method of cooking has certain drawbacks, including the fact that the cooked food is greasy because of its continuous surface contact with the oil during cooking, and the disadvantages normally associated with the storage and use of oil.

In accordance with the present invention, all of the culinary advantages associated with pan cooked food are obtained, yet the food is cooked quite rapidly without burning and without the ordinary shrinkage and flavor loss that is normally associated with pan cooked food.

SUMMARY OF THE INVENTION

The present invention provides for cooking food by compressing the food against a cooking surface, submerging the food in a cooking liquid, and applying heat directly to the cooking surface. Preferably, an interface of liquid, such as a water-based broth, wine or other suitable liquid, is maintained between the food and the cooking liquid during cooking.

The interface of liquid which is maintained between the hot cooking surface and the food vaporizes to form a large number of gas pockets that exert pressure against the food and thus more rapidly transfer heat thereto for assisting in cooking the interior portions thereof, and the heated liquid in which the food is immersed assists in cooking the exterior surface of the food while acting to contain flavor elements that tend to escape from food during cooking. Thus, the food is "flash" cooked very quickly and generally evenly without burning and with a minimum of weight loss and flavor loss.

In the preferred embodiment of the present invention, the generally flat cooking surface if formed with a plurality of dispersed dimples or small impressions which act to collect and hold the aforesaid liquid interface at the cooking surface, such liquid usually being the same water-base broth in which the food is immersed as explained above.

The preferred apparatus embodying the present invention includes a conduit having a cooking pan fixed at each end thereof with a volume of cooking liquid contained in the conduit and the pans and with each pan communicating with the conduit and presenting a generally flat bottom that forms a cooking surface. The conduit is arranged for pivotal movement about a horizontal axis to move the pans upwardly and downwardly, and a burner is located beneath each pan. Each pan is supplied with a perforated compression plate operable to press the food against the bottom surface of such pan. Controls are provided for alternately lowering the two pans to a position immediately above the respective burners therefor, during which the contained cooking liquid flows to the lowered pan, and each burner is automatically energized when the associated pan reaches its lowered position.

BRIEF DESCRIPTION OF THE DRAWINGS

FIG. 1 is a perspective view illustrating the apparatus of the present invention;

FIG. 2 is a detail view illustrating the mechanical arrangement for pivoting the pans, as seen from the rear of the apparatus illustrated in FIG. 1;

DESCRIPTION OF THE PREFERRED EMBODIMENT

Figure 3:
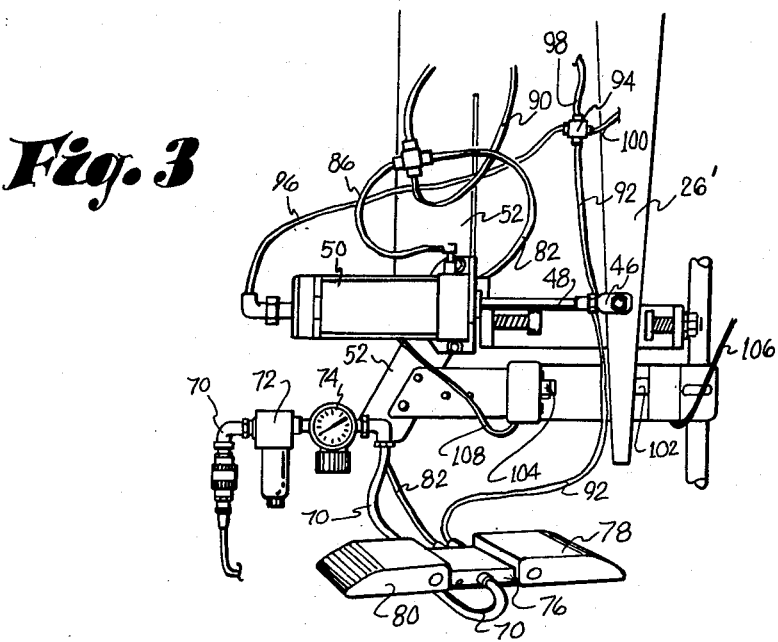
FIG. 3 is a detail view of the control members of the apparatus illustrated in FIG. 1.

Looking now in greater detail at the accompanying drawings, FIG. 1 illustrates a cooking apparatus 10 which includes an elevated table 12 supported by legs 14, and a U-shaped channel or conduit 16 that is rigidly connected at the respective ends thereof to rectangular brackets 17 in which are carried a pair of pans 18, each pan 18 having a bottom cooking surface 20 and side walls 22 extending upwardly therefrom with one of the side walls 22 of each pan 18 being provided with an opening 24 whereby the pans 18 are in communication with each other through the conduit 16.

As best seen in FIGS. 1 and 2, the conduit 16, which has a generally horizontal extent, is supported on the table 12 for pivotal movement about a horizontal axis by a vertical plate 26 that is fixed to the conduit 16 and mounted on a horizontably extending pivot shaft 28 carried in a bearing member 30 secured to the table 12 by brackets 32. For additional rigidity along the extending length of the conduit 16, a pair of support bars 34 is also secured to the plate 26 (see FIG. 2) and extend to a connection with the brackets 17 (see FIG. 5).

An additional pair of hollow bars 36 are secured to the plate 26 and extend upwardly and generally along the conduit 16 to support, at the ends thereof, vertically disposed fluid cylinder 38 having operating rods 40 extending therefrom to support a perforated compression plate 42. A pivoted guide bracket 44 is fixed to the end of each hollow bar 36 and its associated compression plate 42 to maintain the compression plate 42 at a proper position with respect to the pan 18 during reciprocating movement of the operating rod 40 which will be explained in greater detail presently. Thus, the conduit 16 and the superstructure supporting the fluid cylinders 38 and compression plates 42 all pivot together about the pivot shaft 28.

To pivot the conduit 16, the plate 26 includes an extension portion 26' which extends downwardly through the opening in the table 12 and is connected to a yoke 46 mounted at the end of a rod 48 operated by a fluid cylinder 50 that is fixed to the underside of table 12 by a bracket 52.

Figure 4:
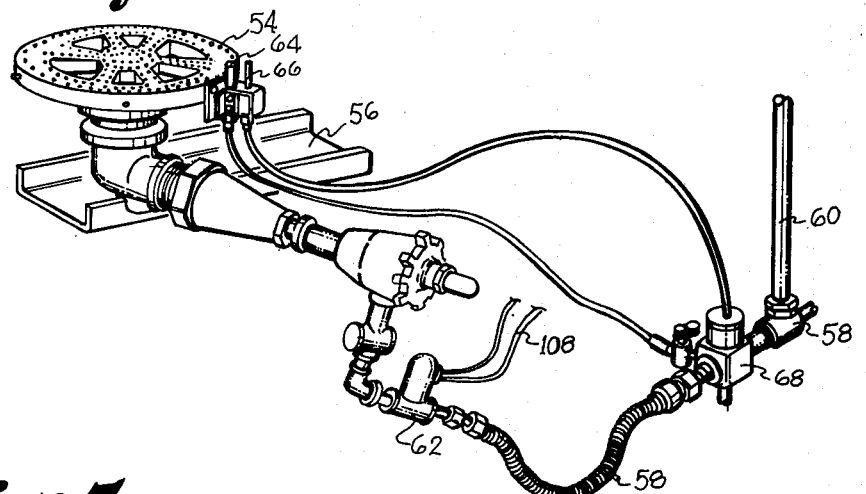
FIG. 4 is a detail view illustrating one of the burners and the feed line therefor.

As best seen in FIGS. 1 and 4, a gas burner 54 is mounted beneath each of the pans 18 by a support 56 extending from the table 12, and a gas supply line 58 extends from a source pipe 60 to each burner 54 with a solenoid operated control valve 62 located between the source pipe 60 and the burner 54. Each burner 54 is provided with a pilot 64 and sensor 66 adjacent thereto, the sensor 66 being connected to a safety cut-off valve 68 located in the supply line 58 to cut off all gas supply to the burner 54 if the pilot 64 should inadvertently become extinguished, all in a conventional manner.

The fluid cylinders 38 and the fluid cylinder 50 are operated by fluid, such as compressed air, supplied from any convenient source through an inlet line 70 having a filter 72, a conventional regulating valve (not shown), and a pressure gauge 74 fitted therein, such air inlet line being connected to a food-operated control device 76 (see FIGS. 1 and 3) which includes a right pedal 78 and a left pedal 80. A connecting line 82 extends from the left pedal 80 to a four-way connector 84 from which one line 86 extends to the right-hand end of fluid cylinder 50, from which another line 88 extends to the bottom end of the fluid cylinder 38 above the left pan 18, and from which a third line 90 extends to the top end of the fluid cylinder 38 above the right pan 18. Similarly, a connecting line 92 extends from the right pedal 78 to a four-way connector 94 from which a first line 96 extends to the left end of fluid cylinder 50, a second line 98 extends to the bottom of right fluid cylinder 38, and a third line 100 extends to the top of left fluid cylinder 38.

To control the aforementioned solenoid-operated gas control valves 62, a pair of spaced contact switches 102, 104 are secured to the bracket 52 beneath the table 12 for disposition in the path of movement of the vertical plate extension 26'. The right switch 102 is connected to the gas contact valve 62 for the left burner 54 by electrical lines 106, and the left switch 102 is connected to the gas control valve 62 for the right burner 54 by electrical lines 108.

To operate the apparatus 10 described above, and assuming it is at its FIG. 1 position with the right pan 18 raised and the left pan 18 lowered as shown, the operator would first pour into the conduit 16 or the pans 18 a suitable volume of cooking liquid 110 such as the aforementioned water-base broth, all of which would flow by gravity to the lowered left pan 18. Next, the operator places a portion of food 112, which may be any edible tissue such as animal, seafood, flow or plant but is preferably a meat product such as fish fillet, portions of deboned chicken, beef, on the bottom surface 20 of the raised right pan 18, which, as will be explained below, has a thin layer of liquid thereon. The operator then presses right foot pedal 78 whereupon foot control device 76 connects the line 92 to exhaust or atmospheric pressure, and connects the line 82 to the air supply line 70. Pressurized air is then transmitted to the right end of fluid cylinder 50 to cause the connecting rod 48 thereof to pivot the plate extension member 26' toward the left in FIGS. 1 and 3 whereby conduit 16 is pivoted about pivot shaft 28 from a first position as shown in FIG. 1 to a second position at which the right pan 18 is lowered to a location immediately above its burner 54 and at which the left pan 18 is raised to a position corresponding to the raised position of the right pan 18 in FIG. 1.

At the same time, pressurized air is admitted to the bottom of left air cylinder 38 through line 88 to raise the perforated plate 42 associated therewith, and air is admitted to the top of right air cylinder 38 to lower the perforated compression plate 42 associated therewith until it presses the portion of food against the bottom surface 20 of the pan 18 with the aforesaid interface of liquid therebetween. The pressure exerted against the food portion may be predetermined by adjusting the aforesaid regulating valve in supply line 70, or if desired, by putting a separate regulating valve in lines 90, 98, and lines 88, 100. Moreover, as soon as the plate extension member 26' moves out of contact with right contact switch 102, the solenoid operated gas control valve 62 for the left burner 54 is closed and such burner 54 is extinguished or de-energized. When the plate extension member 26' reaches its left position with right pan 18 positioned immediately above its associated burner 54, the left switch 104 is contacted and closed by the plate extension member 26' to open the gas control valve 62 for the right burner 54, whereby such burner 54 is lit or energized to apply heat directly to bottom surface of the right pan 18.

After the food portion 112 has been cooked to the desired degree, the operator places another portion of food 112 on the bottom surface 20 of the now raised left pan 18, and presses the left pedal 80 to cause the right pan 18 to be raised and the left pan 18 to be lowered in the identical manner to that described above. Thus, the two pans 18 are alternately supplied with portions of food 112 that are then cooked by the operator alternately pressing the foot pedals 78, 80 in a continuous cycle. Since the cooking liquid 110 continuously flows from one pan 18 to the other, it will remain heated because of its exposure to the cooking surfaces 20 to which heat is being supplied by the burners 54.

In the apparatus described above, the food portion 112 is pressed against the cooking surface 20 of the raised pan 18 whereby compression of the food portion 112 occurs prior to its being submerged in the cooking liquid 110. However, this particular sequence, while usually desirable, is not of critical importance to the present invention since the food portion 112 could also be submerged in the cooking liquid 110 and then pressed against the cooking surface 20 while heat is applied thereto.

Figure 5:
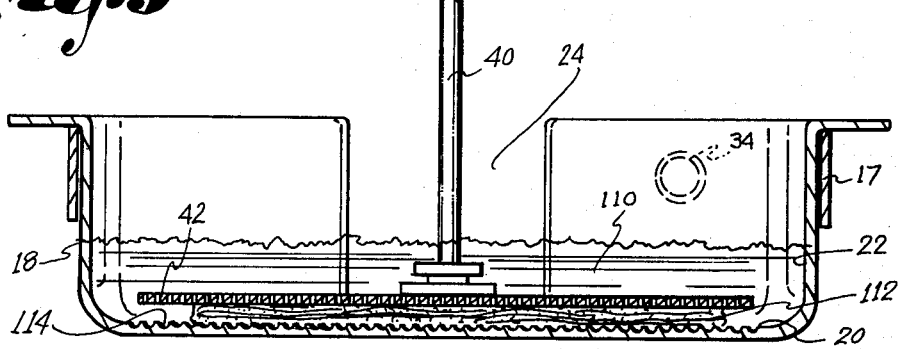
FIG. 5 is a side elevational view taken through a vertical plane of one of the pans.
Figure 6:
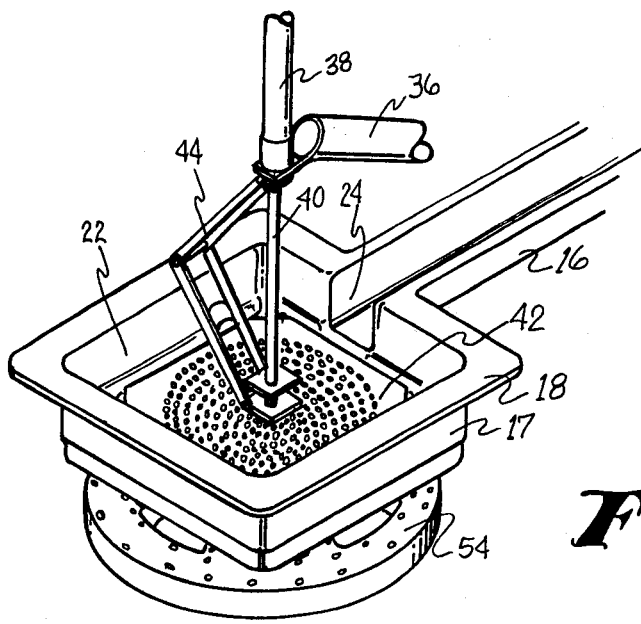
FIG. 6 is a perspective view illustrating one of the pans at its lowered position; and, FIG. 7 is a perspective view similar to FIG. 6 with the pan at its raised position.

FIG. 5 illustrates the arrangement of various elements described above during cooking of the food portion 112, and it will be noted that the food portion 112 is pressed directly against the bottom cooking surface 20 by the compression plate 42 as heat is applied to the underside of cooking surface 20 by a burner 54. As noted above, there is an interface of liquid between the food portion 112 and the cooking surface 20, and the liquid interface is maintained by the pressure applied to the food portion 112 by the compression plate 42. The high intensity heat generated by the burner 54 at the cooking surface 20 (e.g. 400° F. or higher) causes the liquid interface thereat to vaporize into a large number of pressurized steam pockets which have a resulting elevated temperature that is rapidly transmitted into and through the cellular structure of the food portion 112 to cause internal cooking thereof. Additionally, since the cooking liquid 110 has an elevated temperature (e.g. 212° F.) as a result of its constant exposure to the bottom surfaces 20 of both cooking pans 18, and since the food portion 112 is submerged in this cooking liquid 110, the exposed or exterior surfaces of the food portion 112 are cooked by the cooking liquid 110. Accordingly, the food portion 112 is cooked very rapidly with comparatively little weight loss and without burning of the bottom surface thereof which is in contact with the cooking surface 20. For example, it normally takes about eight to ten minutes to cook and a deboned chicken breast using convention boiling methods, with a resulting weight loss of about thirty percent or higher. Using the method and apparatus of the present invention, such deboned chicken breast can be cooked in only one minute with a weight loss of only about ten percent.

While it is usually perferred that the food portion be submerged, during cooking, in water or a water-based broth having characteristics relating to the particular type of food being cooked (e.g. a seasoned chicken broth for cooking portions of deboned chicken), it is to be understood that the food may be submerged in a variety of other suitably liquids, such as wines.

In addition to the rapid and thorough cooking of the food portion 112, advantages are obtained from the submersion of the food portion 112 in the cooking liquid 110 during cooking. The slight barrier effect provided by the cooking liquid 110 at the exposed surfaces of the food portion 112 assists in preventing volatiles and flavor from leaving the food portion 112 during cooking, particularly if the cooking liquid has a density greater than water. Moreover, since the cooking liquid 110 is not relied on exclusively to provide the heat required for thorough cooking, as would be the case where food is immersed in a bath of hot oil as disclosed in the aforesaid U.S. Pat. No. 2,191,275, to Fink, the cooking liquid 110 can be a water-base broth that can be seasoned to add flavor to the food portion 112 during cooking, and the usual disadvantages (e.g. greasy texture) normally associated with fat or oil frying are not realized in the present invention.

Figure 7:
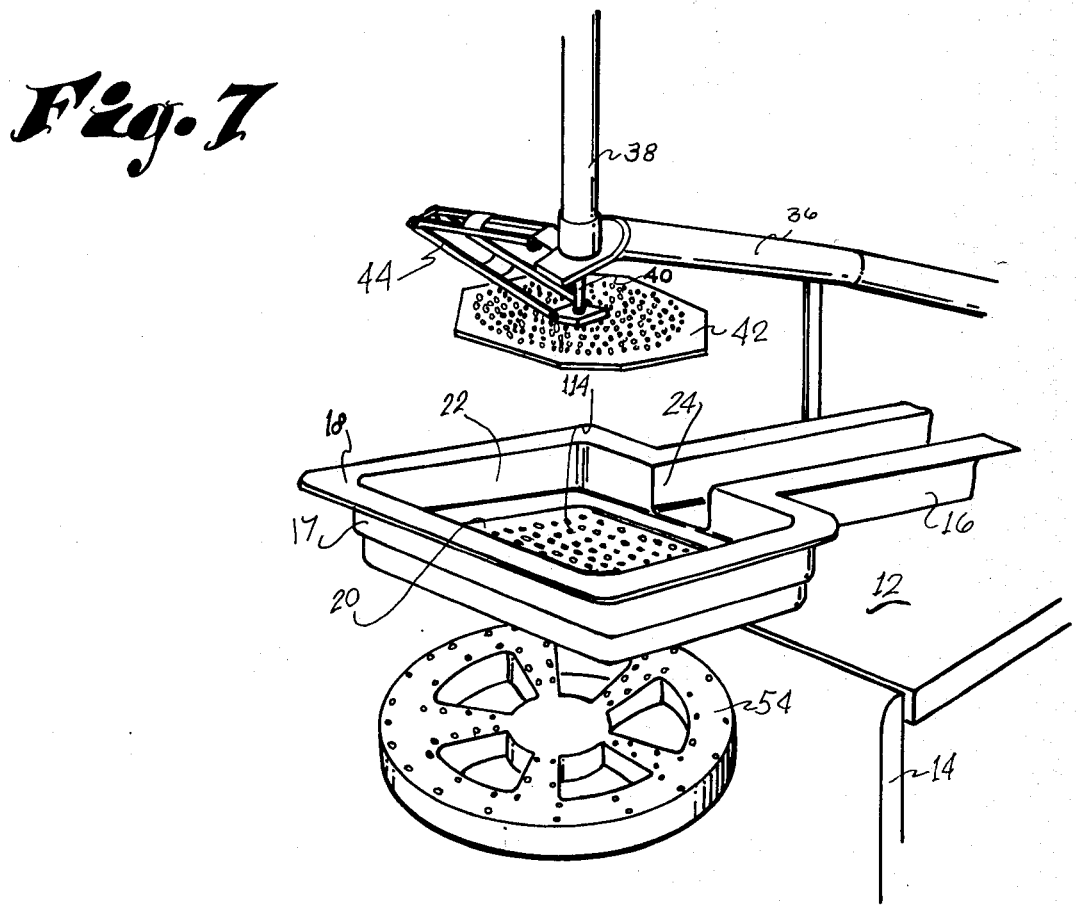

The aforesaid liquid interface between the food portion 112 and the cooking surface 20 may be provided in a variety of ways. In the preferred embodiment of the present invention, it has been found that improved results are obtained if the bottom walls 20 of the pans 18 are formed with a plurality of dispersed dimples or impressions 114, best seen in FIGS. 5 and 7, which collect and hold small pools of the cooking liquid 110 at the cooking surface 20. These dimples provide a greater volume of liquid which can be vaporized, and, since the liquid is physically held at the cooking surface 20, the cooking surface 20 may be covered with any conventional non-stick coating, such as a fluorocarbon resin, which will assist in preventing any sticking of the food portion 112 to the cooking surface 20, all without any accompanying concern that such a coating may result in all of the cooking liquid 110 flowing therefrom during the tilting of the cooking surface 20 as the pans 18 are raised and lowered. It has been found in actual practice that excellent results are obtained if the cooking surface 20 has a thickness of 40/1000-inch to give a rapid transfer of the heat from the burner 54 to the food portion 112, and forming the dimples 114 with a generally concave shape having a depth of about 20/1000-inch. These dimples 114 will collect and maintain a volume of liquid which will provide an excellent interface between the food portion 112 and the cooking surface 20, and there will be some flow of liquid from one dimple 114 to another as the pans 18 are raised and lowered so that the generally flat portion of the cooking surface 20, between the dimples 114 will have a generally continuous coating of liquid thereacross.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim :

1. Apparatus for flash cooking a portion of food, comprising:
   (a) a pan having side walls extending upwardly from a generally flat cooking surface on which said food portion is supported, one of said side walls having an opening therein;
   (b) selectively operable compression means for pressing said food portion against said cooking surface;
   (c) means for forming an interface of liquid between said cooking surface and said food portion at the time said food portion is pressed against said cooking surface;
   (d) selectively operable means for causing said pressed food portion to be submerged in a heated cooking liquid, said selectively operable submerging means including a conduit leading to said side opening and mounted for pivotal movement about a horizontal axis, and said selectively operable submerging means also including conduit control means operable to move said conduit to a first position at which it extends from said pan in an upward direction to cause said cooking liquid to flow into said pan and to a second position at which it extends in a downward direction to cause said cooking liquid to flow out of said pan.

2. Apparatus for flash cooking a portion of food as defined in claim 1 and further characterized in that conduit and said pan are rigidly connected to one another, in that said heat source means comprises a burner located directly beneath said pan at said first position of said conduit means, and in that heat control means are provided for energizing said heat source when said conduit means reaches said first position thereof and for de-energizing said heat source when said conduit means reaches said second position thereof.

3. Apparatus for flash cooking a portion of food, comprising:
 (a) a U-shaped conduit mounted for pivotal movement about a horizontal axis;
 (b) first and second pans mounted at each end of said conduit, each said pan having a generally flat bottom surface and side walls extending upwardly therefrom with said side walls having an opening therein communicating with said conduit, said flat bottom surface of each said pan having a plurality of dispersed dimples formed therein;
 (c) a volume of cooking liquid contained within said conduit and pans;
 (d) first and second burner means located beneath said first and second pans, respectively;
 (e) a compression plate mounted above each of said first and second pans and a fluid motor for moving said compression plate toward and away from said bottom surface of said pans, respectively;
 (f) conduit control means operable to pivot said conduit about said horizontal axis thereof between a first position at which said conduit extends downwardly from said first pan to said second pan and a second position at which said conduit extends downwardly from said second pan to said first pan, whereby said volume of cooking liquid flows alternately between said first and second pans; and
 (g) heat control means operable to automatically energize said burner means under said second pan and to de-energize said burner means under said first pan at said first position of said conduit, and operable to automatically energize said first burner and to de-energize said second burner at said second position of said conduit.

4. Apparatus for flash cooking a portion of food as defined in claim 3 and further characterized in that cooking liquid in a water-based broth having a density greater than water.

5. Apparatus for flash cooking a portion of food as defined in claim 3 and further characterized in that said conduit control means includes a foot-operated control device for causing said conduit to be pivoted between said first and second position thereof.

* * * * *